(12) United States Patent
McCune et al.

(10) Patent No.: US 11,231,201 B2
(45) Date of Patent: Jan. 25, 2022

(54) SEASONAL AIRFLOW CONTROL SYSTEM

(71) Applicant: Johnson Controls Technology Company, Auburn Hills, MI (US)

(72) Inventors: Tyler P. McCune, El Dorado, KS (US); Theresa N. Gillette, Wichita, KS (US); Jonathan A. Burns, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 184 days.

(21) Appl. No.: 16/016,221

(22) Filed: Jun. 22, 2018

(65) Prior Publication Data
US 2019/0383512 A1 Dec. 19, 2019

Related U.S. Application Data

(60) Provisional application No. 62/685,143, filed on Jun. 14, 2018.

(51) Int. Cl.
| | | |
|---|---|---|
| *G05B 19/042* | (2006.01) | |
| *F24F 11/65* | (2018.01) | |
| *F24F 11/52* | (2018.01) | |
| *F24F 11/58* | (2018.01) | |
| *F24F 11/64* | (2018.01) | |
| *F24F 11/72* | (2018.01) | |
| *F24F 11/80* | (2018.01) | |
| *F24F 110/10* | (2018.01) | |

(Continued)

(52) U.S. Cl.
CPC .............. *F24F 11/65* (2018.01); *F24F 11/52* (2018.01); *F24F 11/58* (2018.01); *F24F 11/64* (2018.01); *F24F 11/72* (2018.01); *F24F 11/80* (2018.01); *G05B 19/042* (2013.01); *F24F 2110/10* (2018.01); *F24F 2110/12* (2018.01); *F24F 2130/00* (2018.01); *F24F 2130/10* (2018.01); *F24F 2130/20* (2018.01); *G05B 2219/2614* (2013.01)

(58) Field of Classification Search
None
See application file for complete search history.

(56) References Cited

U.S. PATENT DOCUMENTS

| | | |
|---|---|---|
| 8,660,708 B2 | 2/2014 | Narayanamurthy et al. |
| 9,063,555 B2 | 6/2015 | DiFulgentiz |

(Continued)

FOREIGN PATENT DOCUMENTS

| | | |
|---|---|---|
| CN | 201053732 Y | 4/2008 |
| CN | 201053733 Y | 4/2008 |

(Continued)

*Primary Examiner* — Jason Lin
(74) *Attorney, Agent, or Firm* — Fletcher Yoder, P.C.

(57) ABSTRACT

A climate management system includes a controller configured to receive an input indicative of an airflow rate setpoint for each zone of a plurality of zones of the climate management system. The controller is further configured to determine a respective airflow rate adjustment for each airflow rate setpoint and adjust each airflow rate setpoint based on the respective airflow rate adjustment to determine a respective adjusted airflow rate for each zone of the plurality of zones, where the respective airflow rate adjustment for each zone of the plurality of zones is based on a current annual season of a plurality of annual seasons.

28 Claims, 8 Drawing Sheets

(51) Int. Cl.
*F24F 110/12* (2018.01)
*F24F 130/00* (2018.01)
*F24F 130/10* (2018.01)
*F24F 130/20* (2018.01)

(56) References Cited

U.S. PATENT DOCUMENTS

| | | | | |
|---|---|---|---|---|
| 2004/0238653 A1* | 12/2004 | Alles | ............... | F24F 3/0442 236/49.3 |
| 2005/0155363 A1* | 7/2005 | Shah | ............... | G05D 22/02 62/176.6 |
| 2007/0119958 A1* | 5/2007 | Kates | ............... | G05D 23/1934 236/1 B |
| 2008/0179052 A1* | 7/2008 | Kates | ............... | F24F 11/30 165/208 |
| 2009/0065595 A1 | 3/2009 | Kates | | |
| 2010/0070085 A1* | 3/2010 | Harrod | ............... | G05B 19/042 700/276 |
| 2010/0082162 A1* | 4/2010 | Mundy | ............... | F24F 3/044 700/277 |
| 2011/0264296 A1* | 10/2011 | Drake | ............... | G01D 4/004 700/296 |
| 2011/0276183 A1* | 11/2011 | Liu | ............... | F24F 11/70 700/276 |
| 2012/0023977 A1* | 2/2012 | Kim | ............... | H02J 3/14 62/89 |
| 2012/0095604 A1* | 4/2012 | Alexanian | ............... | A01G 25/16 700/284 |
| 2012/0310418 A1* | 12/2012 | Harrod | ............... | G05B 19/042 700/276 |
| 2013/0274928 A1* | 10/2013 | Matsuoka | ............... | G05D 23/1904 700/276 |
| 2014/0371876 A1* | 12/2014 | Isaacson | ............... | G05B 15/02 700/9 |
| 2016/0062332 A1* | 3/2016 | Call | ............... | G05B 19/042 700/276 |
| 2018/0031265 A1* | 2/2018 | Janniello | ............... | F24F 11/74 |
| 2019/0170375 A1* | 6/2019 | Poerschke | ............... | F24F 3/044 |

FOREIGN PATENT DOCUMENTS

| | | |
|---|---|---|
| CN | 102563822 A | 7/2012 |
| CN | 106813359 A | 6/2017 |
| CN | 107270432 A | 10/2017 |
| JP | 2001193983 A | 7/2001 |
| JP | 2007127376 | 5/2007 |
| JP | 2007127376 A | 5/2007 |
| KR | 20140051887 A | 5/2014 |
| KR | 20190094838 A | 8/2019 |
| WO | 2017198273 | 11/2017 |
| WO | 2017198273 A1 | 11/2017 |

\* cited by examiner

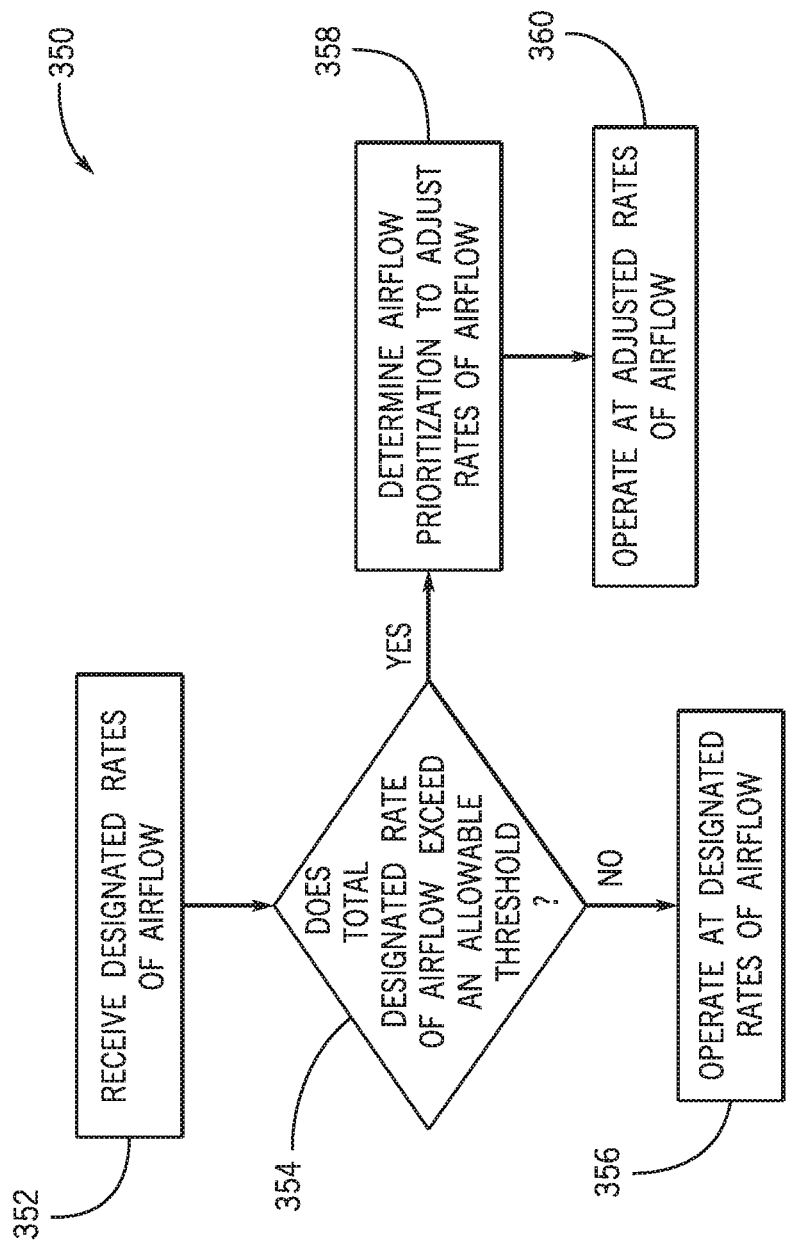

SEASONAL AIRFLOW CONTROL SYSTEM

CROSS REFERENCE TO RELATED APPLICATIONS

This application claims priority from and the benefit of U.S. Provisional Application Ser. No. 62/685,143, entitled "SEASONAL AIRFLOW CONTROL SYSTEM," filed Jun. 14, 2018, which is hereby incorporated by reference in its entirety for all purposes.

BACKGROUND

The disclosure relates generally to heating, ventilation, and air conditioning (HVAC) systems, and specifically, to adjusting operations of an HVAC system.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Environmental control systems are utilized in residential, commercial, and industrial environments to control environmental properties, such as temperature and humidity, for occupants of the respective environments. The environmental control system may control the environmental properties through control of an airflow delivered to and ventilated from the environment. For example, an HVAC system may transfer heat between the airflow and refrigerant flowing through the system and then direct the airflow to areas to be conditioned, such as rooms. It is now recognized that certain operations of the HVAC system may be adjusted, such as based on factors related to the location of the areas to be conditioned, to improve an efficiency of the HVAC system and/or to make the conditioned areas more comfortable to occupants of the areas.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a climate management system includes a controller configured to receive an input indicative of an airflow rate setpoint for each zone of a plurality of zones of the climate management system. The controller is further configured to determine a respective airflow rate adjustment for each airflow rate setpoint and adjust each airflow rate setpoint based on the respective airflow rate adjustment to determine a respective adjusted airflow rate for each zone of the plurality of zones, where the respective airflow rate adjustment for each zone of the plurality of zones is based on a current annual season of a plurality of annual seasons.

In one embodiment, a climate management system includes a control system configured to control climate characteristics in a plurality of zones of a building, where the control system includes a memory device and a processor. The memory device includes instructions that, when executed by the processor, cause the processor to receive an input indicative of a plurality of airflow rate setpoints, where each airflow rate setpoint of the plurality of airflow rate setpoints corresponds with a respective zone of the plurality of zones. The instructions further cause the processor to determine a respective airflow rate adjustment for each airflow rate setpoint of the plurality of airflow rate setpoints, where the respective airflow rate adjustment is based on a current yearly season of a plurality of yearly seasons, and the instructions cause the processor to calculate a respective adjusted airflow rate for each zone of the plurality of zones based on the respective airflow rate setpoint and respective airflow rate adjustment.

In one embodiment, a climate management system includes a control system configured to control climate characteristics in a plurality of zones of a building, where the control system comprises a memory device and a processor. The memory device includes instructions that, when executed by the processor, cause the processor to provide airflow to a zone of the plurality of zones at a first rate, where the first rate is based on a first airflow rate adjustment associated with a first annual season of a plurality of annual seasons. The instructions further cause the processor to determine a transition from the first annual season to a second annual season of the plurality of annual seasons and to provide the airflow to the zone at a second rate in response to determination of the transition from the first annual season to the second annual season, wherein the second rate is based on a second airflow rate adjustment associated with the second annual season of the plurality of annual seasons.

DRAWINGS

Various aspects of this disclosure may be better understood upon reading the following detailed description and upon reference to the drawings in which.

Figure 7:
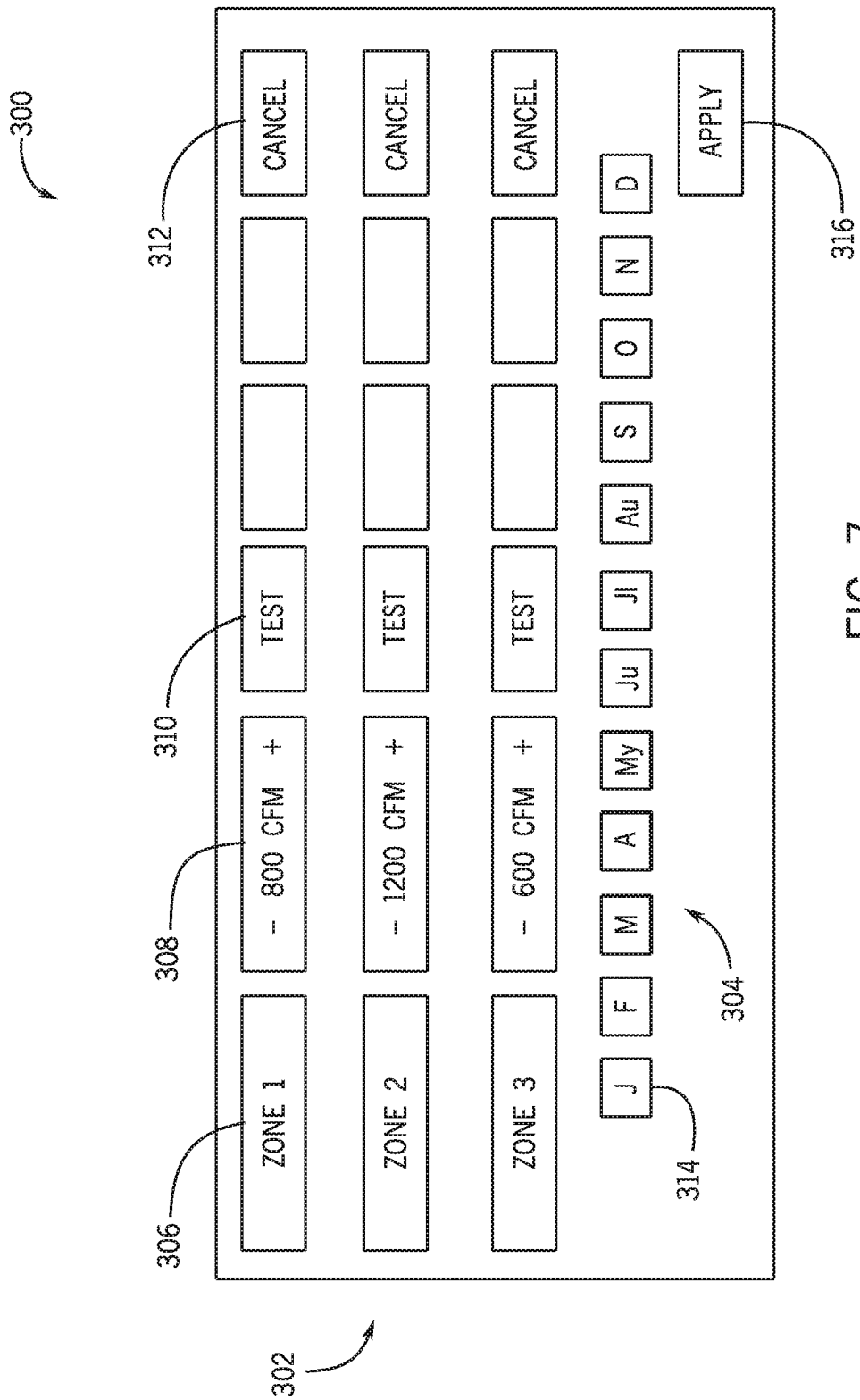

FIG. 7 is a schematic of an embodiment of an interface for adjusting settings of an HVAC system in a particular season, which can be used in any of the systems of FIGS. 1-5, in accordance with an aspect the present disclosure; and FIG. 8 is a flowchart of an embodiment of a method for adjusting an HVAC system to determine operation at certain rates of airflow, which can be used in any of the systems of FIGS. 1-5, in accordance with an aspect the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to heating, ventilating, and air conditioning (HVAC) systems. For example, an HVAC system may heat and/or cool an airflow, then direct the airflow to certain areas of a building to be conditioned by the HVAC system. The areas may be zoned, in that certain properties of the airflow, such as temperature and airflow rate, may be independently controlled for each zoned area. Control may be performed manually by a user or automatically by the HVAC system.

Certain areas of the building to be conditioned may be subject to annual changes based on external conditions, such as seasonal changes. For example, the building or area to be conditioned is located in a geographic location that experiences long, hot summers and short, mild winters. In some existing HVAC systems, a rate of airflow supplied by the HVAC system to the building or area to be conditioned is the same throughout the year. However, in the aforementioned example, a suitable rate of airflow supplied by the HVAC system for the summer season may be different than a suitable rate of airflow for the winter season. For example, a higher rate of airflow may be more suitable or appropriate in the summer, and a lower rate of airflow may be more suitable or appropriate in the winter. Additionally, within the building, different zones may also experience different external conditions based on location of the respective zone within the building. By way of example, a zone may be located in a portion of the building that is exposed to the sun during the hottest time of a day. As such, a suitable rate of airflow for the zone during that time may be different than a suitable rate of airflow for a different zone that is not exposed to the sun at that time or at the same intensity.

Thus, in accordance with certain embodiments of the present disclosure, it is presently recognized that adjusting a rate of airflow for different zones, such as based on seasonal time periods, may enable more efficient operation of the HVAC system and/or enable more desirable or comfortable conditioning of the different zones. That is, adjusting the rate of airflow based on external conditions may enable more optimized and/or more efficient conditioning of the zones within the building. Specifically, the rate of airflow for a particular zone may be adjusted based on a location of the zone within a building and a season or other yearly time period characterized by particular weather patterns. Desired settings for the rate of airflow may be set during installation of the HVAC system and/or after installation via a user. The HVAC system may then be configured to adjust the corresponding rate of airflow based on the desired settings via adjusting operation of component of the HVAC system.

Figure 1:
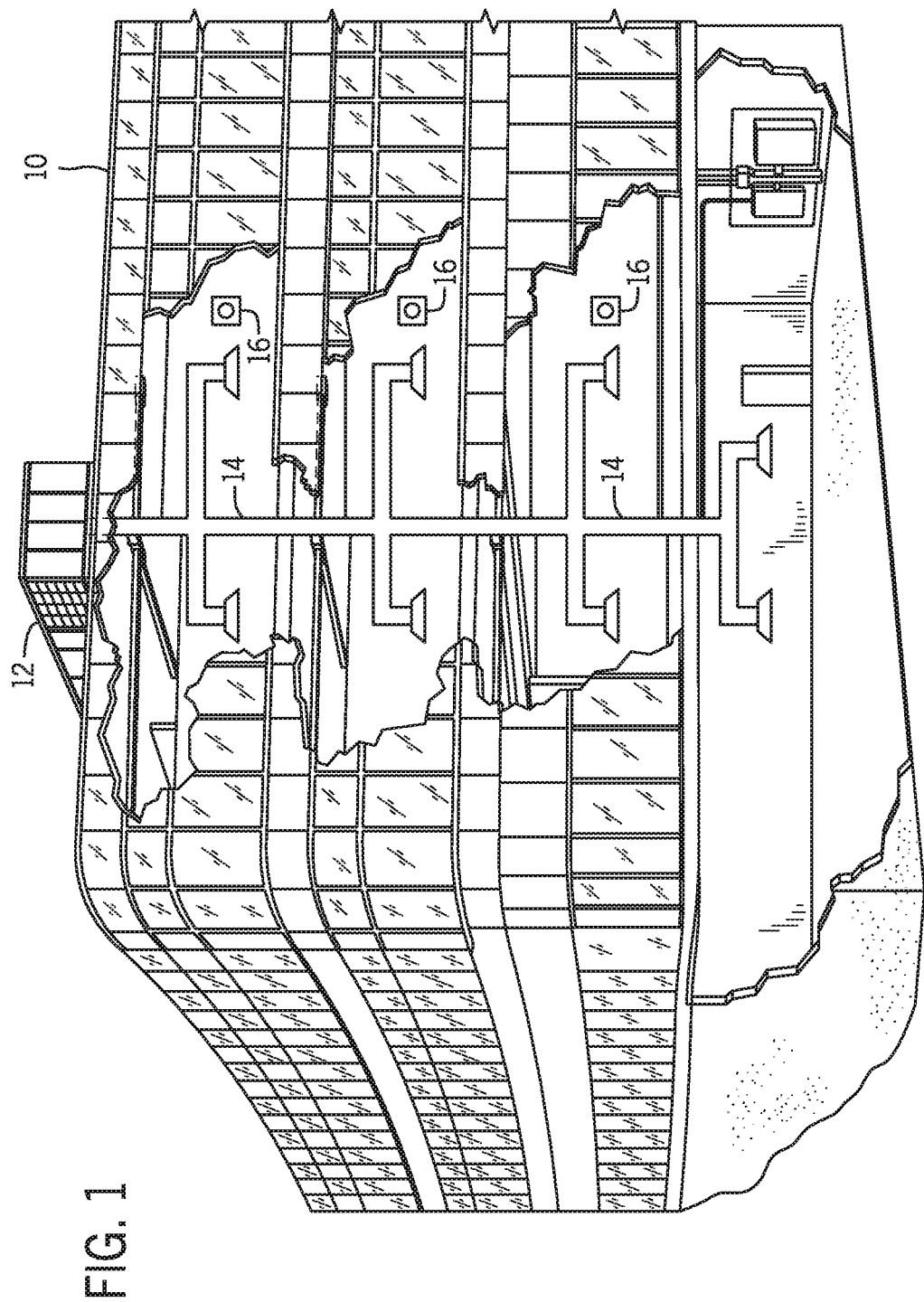
FIG. 1 is a schematic of an environmental control system for building environmental management that may employ one or more HVAC units, in accordance with an aspect of the present disclosure.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
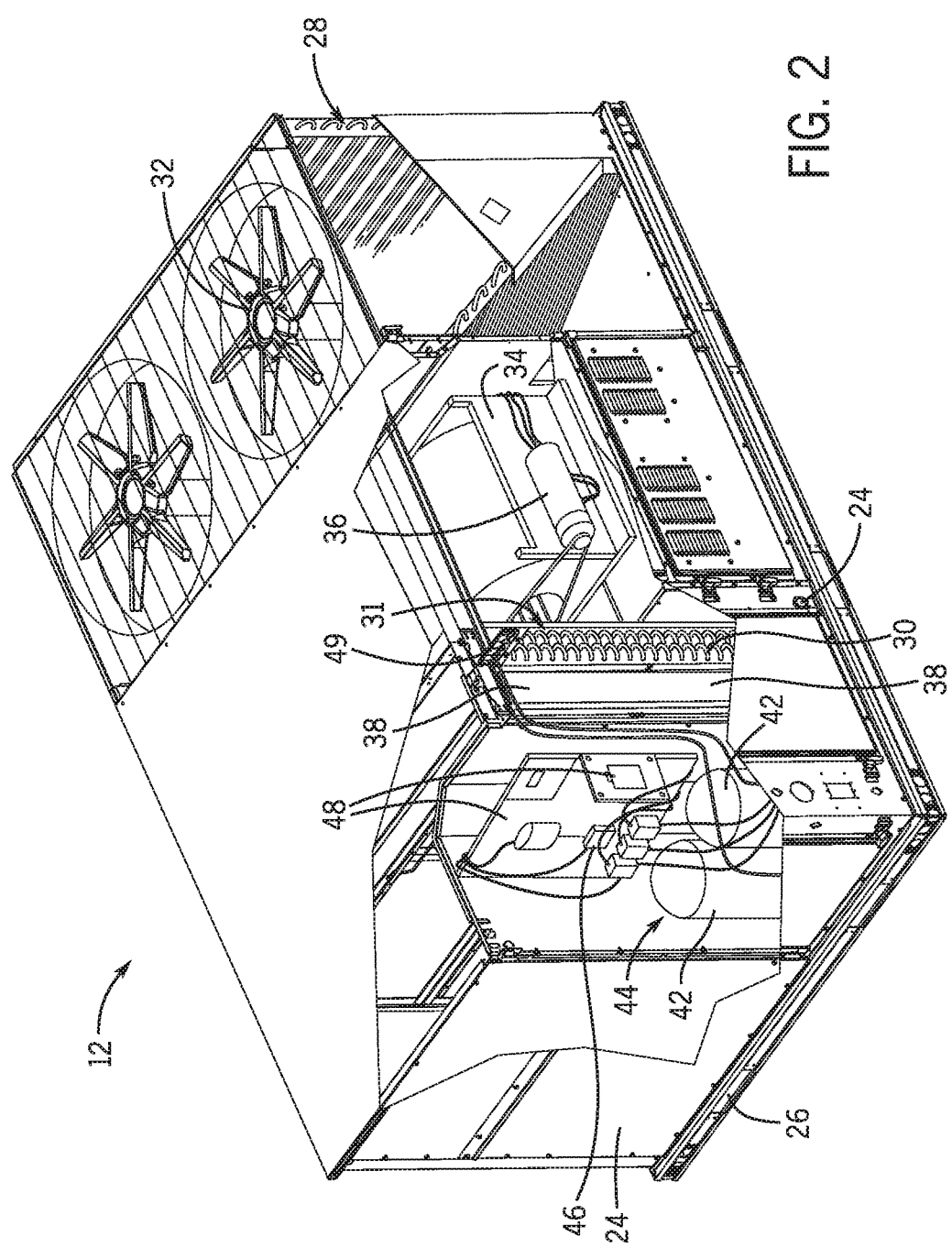
FIG. 2 is a perspective view of an embodiment of the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
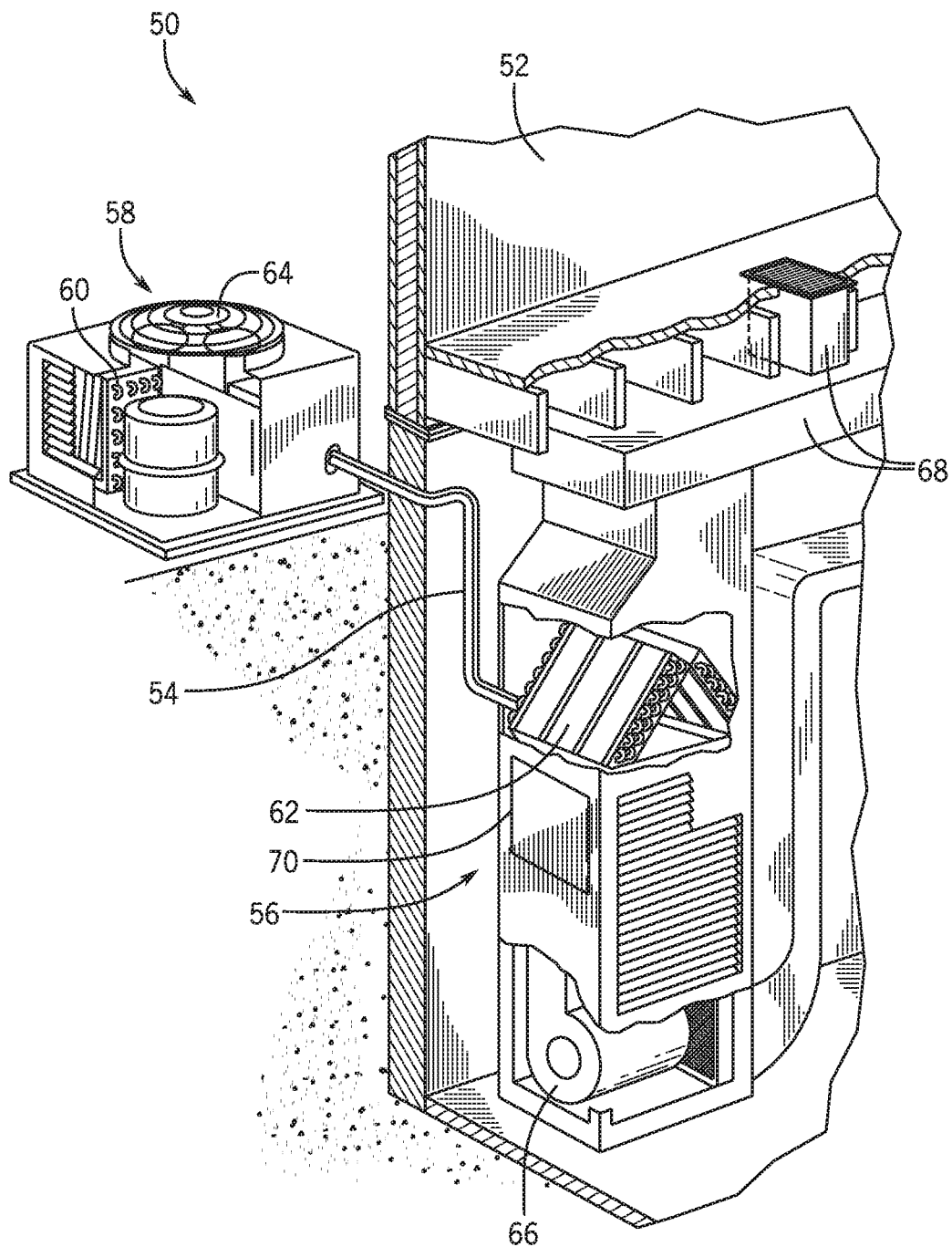
FIG. 3 is a schematic of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
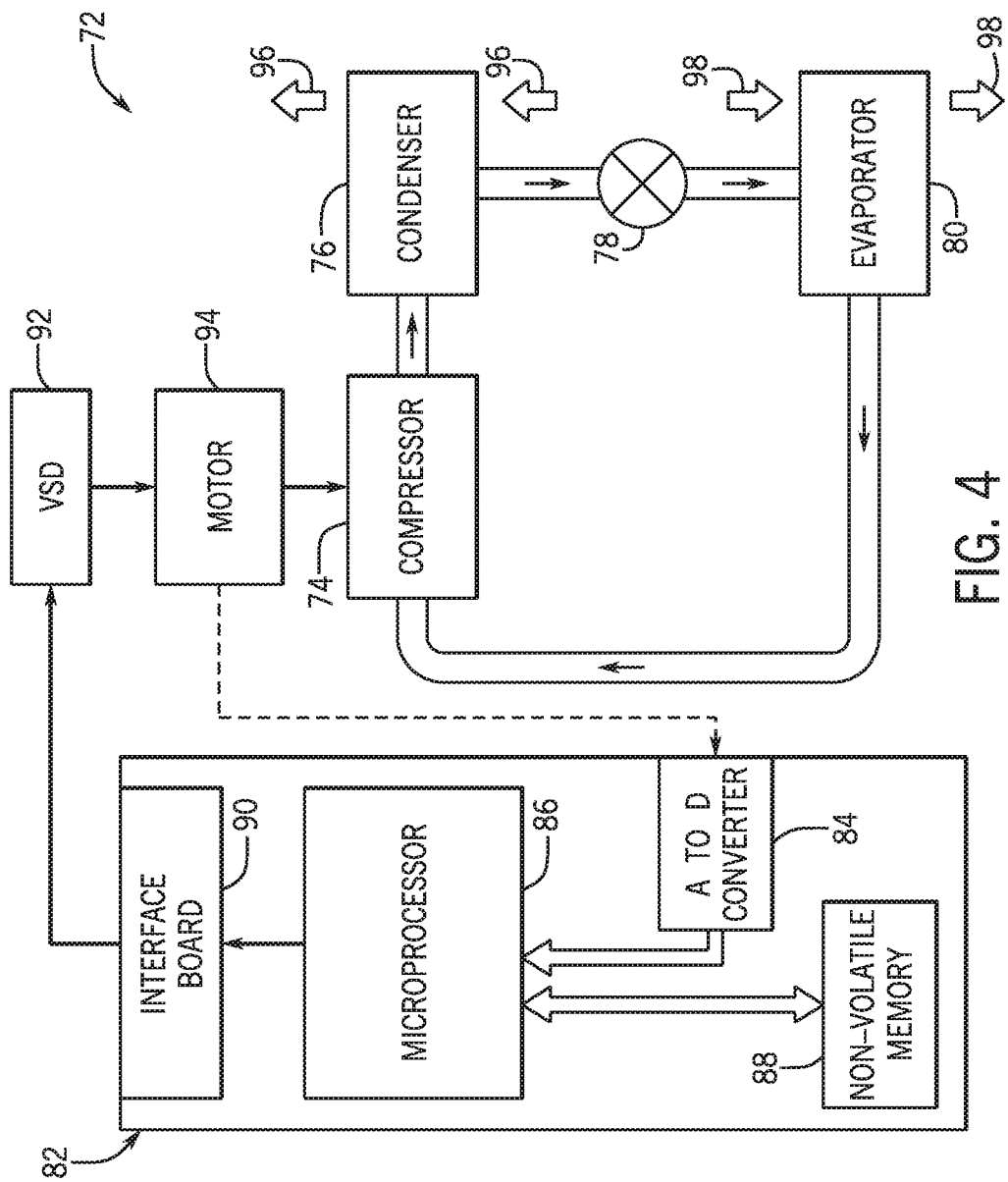
FIG. 4 is a schematic of an embodiment of a vapor compression system that can be used in any of the systems of FIGS. 1-3, in accordance with an aspect the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As mentioned above, HVAC systems may supply air to condition different zones of a building. A particular airflow rate for each zone may be selected in order to supply air efficiently to the particular zone and/or to achieve a desired environmental condition within the zone. The rate of airflow may depend at least on external environmental conditions, which may change based on a particular season or time of year and/or based on the geographic location of the building having the zones. As such, the rate of airflow supplied to each zone may be adjusted based on the season and/or the location of the zone, such as the geographic location of the building having the zone or the particular location of the zone within the building.

In accordance with present embodiments, a desired or target rate of airflow supplied by the HVAC system may be individually set or determined for each zone based on a season or other yearly time period and/or a geographic location of the building or location of the zone within the building. For example, seasons of the year, date ranges for each season, weather patterns or characteristics associated with each season, geographic location of a building, particular locations of zones within the building, or other suitable data or information may be provided and input during installation of the HVAC system and/or after installation of the HVAC system. For example, after installation of the HVAC system, a user and/or homeowner may input any of the information discussed above into a controller, such as a thermostat, of the HVAC system. Based on these settings, the HVAC system may supply air to each zone at a particular airflow rate based on the seasonal and/or location data provided. Additionally, the particular airflow rates at which air is provided into each zone may be adjusted by the HVAC system as the seasons change. For example, the HVAC system may be configured to supply air to a first airflow rate during the spring season, and the HVAC system may adjust the first airflow rate to a second airflow rate as the spring season transitions into the summer season. As used herein, a "season" refers to a time segment within a year or other time period. For example, a season may be a traditional calendar season, such as spring or summer. However, a season may also be any other time segment within a year or other time period. For example, a season may be defined by a user as a range of user-selected calendar dates. That is, a season may be defined, such as by a user, by a particular block of time, which may vary based on certain parameters. For example, a season may correspond to different blocks of time at different geographic locations of the HVAC system and/or may correspond to different blocks of time for different calendar years. Indeed, based on the configuration of the HVAC system, the geographic location of the HVAC system, user input, and/or other factors, a calendar year may include one, two, three, four, five, six or more define seasons, and the HVAC system may be configured to vary operation according to the different defined seasons, as described below.

Moreover, it should be appreciated that a rate of airflow for a particular zone may be determined, selected, set, and/or provided independently of a current, desired, or target temperature of a conditioned space within the zone. For example, while an increased airflow rate may enable a faster rate of temperature change within the zone relative to a slower airflow rate, the airflow rate may not be based on the current, desired, or target temperature. Instead, as noted above, the airflow rate may be determined, selected, set, and/or provided based on other or additional data, such as a current season of the year.

Figure 5:
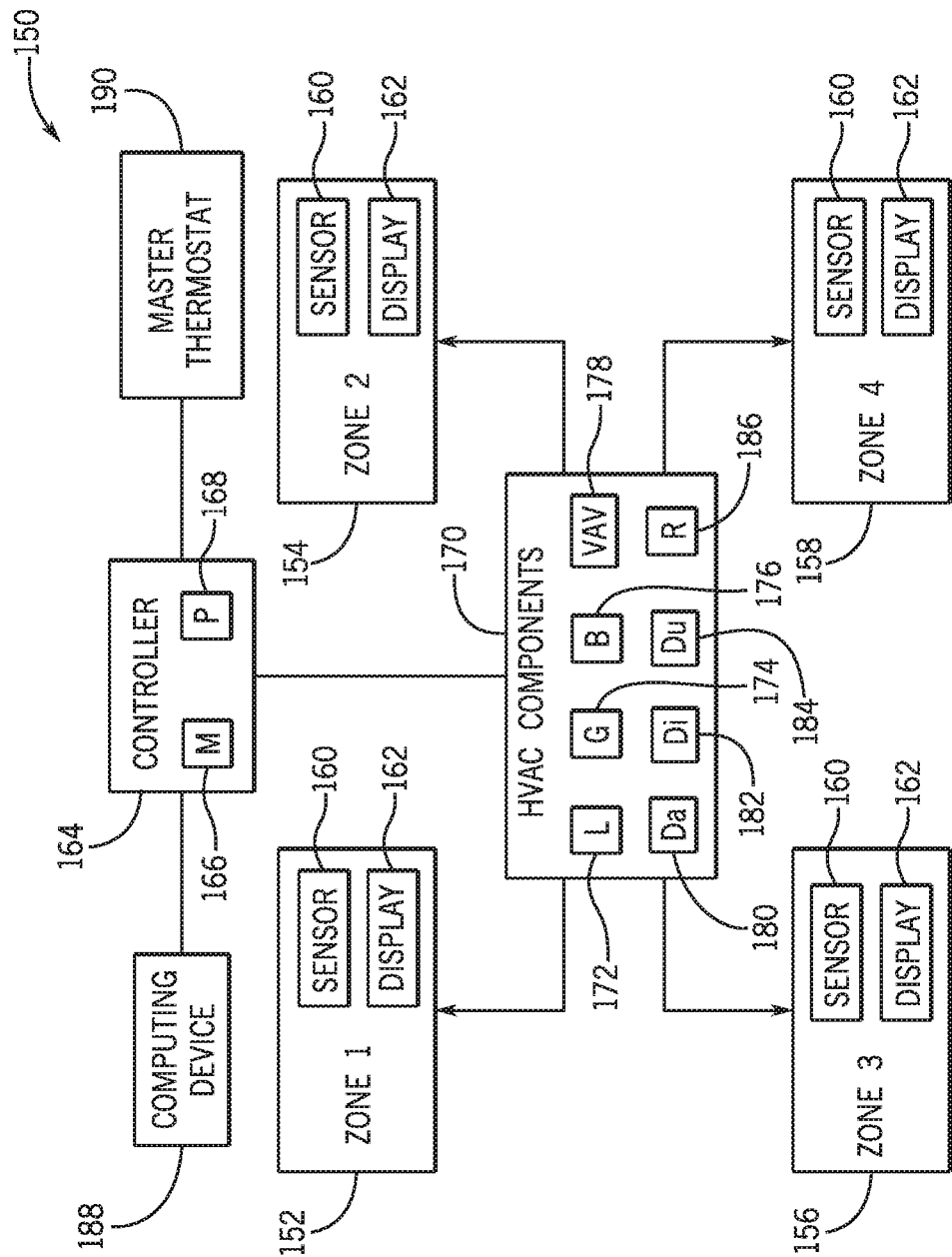
FIG. 5 is a schematic of an embodiment of an HVAC system configured to independently direct airflow to different zones, which can be used in any of the systems of FIGS. 1-4, in accordance with an aspect the present disclosure.

FIG. 5 is a schematic illustrating an HVAC system 150 configured to adjust airflow rates for airflows supplied to different zones. As illustrated in FIG. 5, the HVAC system 150 includes a first zone 152, a second zone 154, a third zone 156, and a fourth zone 158, each of which includes sensors 160 and a control panel, such as a zone panel or a thermostat having a display 162. It should be appreciated that while four zones are illustrated in FIG. 5, any number of zones may be included in the HVAC system 150.

The sensors 160 are configured to monitor respective conditions of each zone 152-158, such as temperature, humidity, and/or a rate of airflow supplied to the respective zone. The display 162 of the control panel may be configured to enable adjustment of respective desired settings within each zone 152-158, such as desired temperature, desired rate of airflow, desired operation mode. The display 162 of each zone may also be configured to enable input of data or settings, such as information related to each season of the year. For example, the display 162 may enable input of information related to the number of seasons in the year, the name of each season, the months of the year that correspond to each season, average weather data for each season, and so forth. The settings of each zone 152-158 may be set independently from one another.

Different zones 152-158 may be located in different areas of a building. As an example, the first zone 152 may be located on a ground floor of a building and at a side of the building exposed to the sun during the afternoon. On the other hand, the second zone 154 may be located underground and therefore may not be exposed to the sun at any time of day. Thus, the first zone 152 may be subject to higher temperature conditions than the second zone 154 during most of the day. As such, during a summer time or season when the temperature outside is typically hotter, the first zone 152 may be subject to higher and more uncomfortable temperatures than the second zone 154, while the second zone 154 may be more mild and comfortable for an occupant than the first zone 152. In other words, the conditions of the first zone 152 may be different from the conditions of the second zone 154, which may justify providing airflows having different characteristics to the different zones 152-158. For example, when conditioning or cooling the first and second zones 152 and 154 during the summer season, it may be more desirable or comfortable for an occupant in the first zone 152 to receive a higher rate of airflow than for an occupant in the second zone 154. However, during a winter time or season when the temperature outside is typically cooler, the first zone 152 may be subject to more mild temperatures than the second zone 154, while the second zone 154 may be colder and more uncomfortable for an occupant than the first zone 152. Thus, in the winter time, the HVAC system 150 may be configured to supply the second zone 154 with airflow at a higher rate of airflow than the first zone 152 when conditioning or heating the first and second zones 152 and 154.

As mentioned, in some embodiments, the display 162 is configured to enable adjustment of settings for each zone 152-158. However, in additional or alternative embodiments, the HVAC system 150 may automatically adjust settings for each zone 152-158. For example, the HVAC system 150 includes a controller 164, such as the control panel 82, configured to adjust settings for each zone 152-158. The controller 164 includes a memory 166 and a processor 168. The memory 166 may be a mass storage device, a flash memory device, removable memory, or any other non-transitory computer-readable medium that includes instructions regarding control of the HVAC system 150. The memory 166 may also include volatile memory such as randomly accessible memory (RAM) and/or non-volatile memory such as hard disc memory, flash memory, and/or other suitable memory formats. The processor 168 may execute the instructions stored in the memory 166, such as instructions to determine desired operational settings for each zone 152-158 and to operate HVAC components 170 in response to the respective desired settings. For example, the controller 164 includes a clock to determine a current time, such as a particular calendar date, corresponding with a particular season. The controller 164 may then determine the desired operational settings based on the particular season. Thus, the controller 164 uses the clock to determine the designated airflow rate for the particular time.

The HVAC components 170 may include louvers 172, grilles 174, blowers 176, variable air volume (VAV) boxes 178, dampers 180, diffusers 182, ducts 184, and/or registers 186 that may be adjusted to adjust the rate of airflow into each zone 152-158. For example, the controller 164 may adjust positioning of the louvers 172, grilles 174, dampers 180, diffusers 182, ducts 184, and/or registers 186 to adjust an amount and/or a rate of airflow provided to each zone 152-158. Furthermore, the controller 164 may adjust operation of the blowers 176 and/or the VAV boxes 178 to adjust the rate of airflow supplied to each zone 152-158. It should be appreciated that the controller 164 may also adjust other components of the HVAC system 150 not mentioned above to adjust the rate of airflow into each zone 152-158.

The controller 164 may also be in communication with a computing device 188, such as a computer, a tablet, a phone, another component, or any combination thereof, and/or a master thermostat 190 to adjust the rate of airflow for each zone 152-158. As such, settings may be adjusted remotely, such as via an application, a website, or any other suitable method. Whereas each display 162 may enable control a designated rate of airflow within the respective zone having the display 162, the computing device 188 and the master thermostat 190 may be configured to adjust a current designated rate of airflow into each zone 152-158, adjust time periods of each season, adjust a designated rate of airflow into each zone 152-158 based on each season, or any other suitable setting for each zone 152-158. In some embodiments, the master thermostat 190 is located in one of the zones 152-158, but in additional or alternative embodiments, the master thermostat 190 is located external to the zones 152-158.

Figure 6:
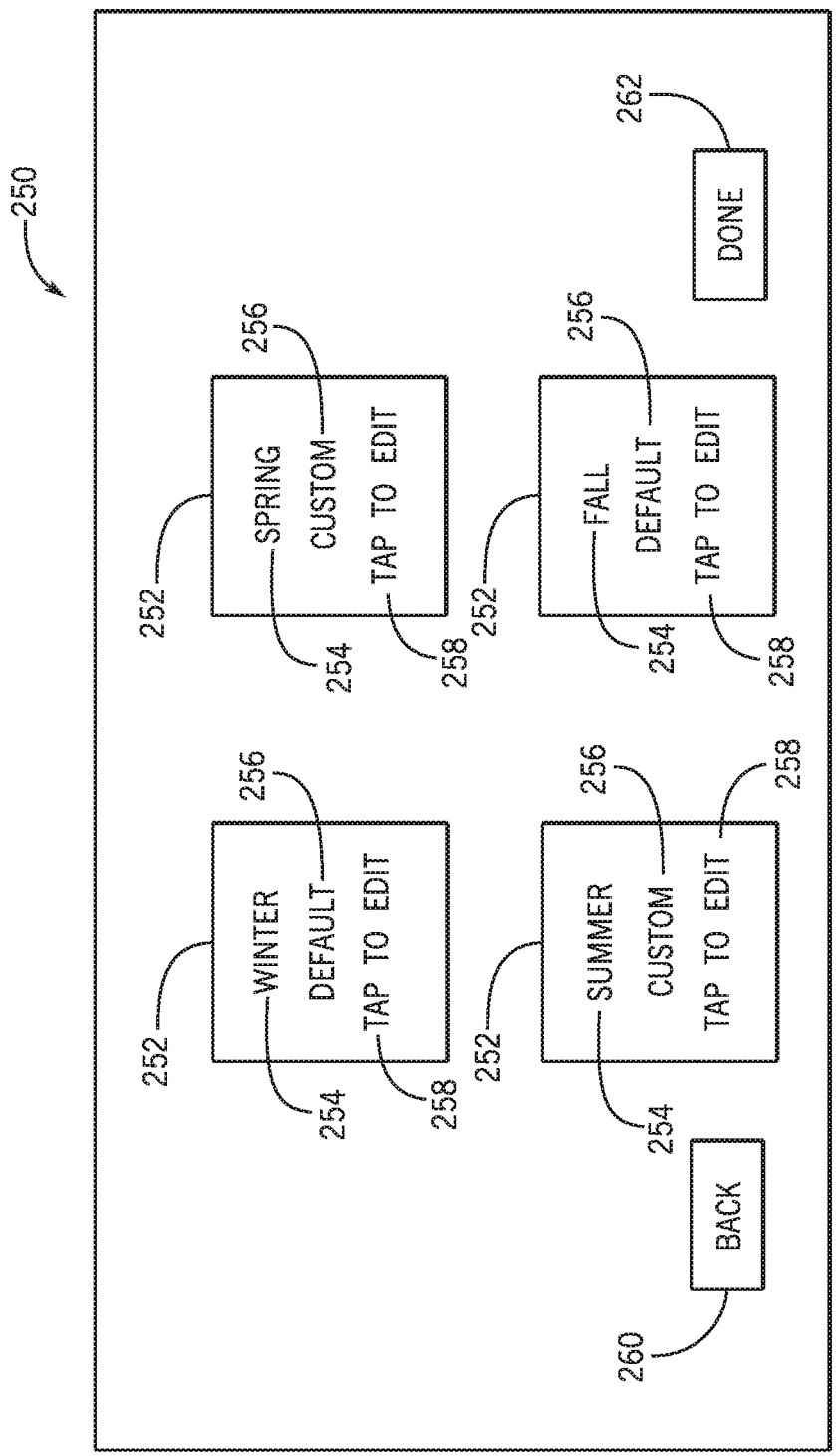
FIG. 6 is a schematic of an embodiment of an interface for adjusting settings of an HVAC system, which can be used in any of the systems of FIGS. 1-5, in accordance with an aspect the present disclosure.

To further illustrate adjusting the designated rate of airflow based on seasons of the year, FIG. 6 is a schematic of an embodiment of an interface 250 configured to enable adjustment of settings for each season. As an example, the interface 250 may be displayed on the computing device 188 and/or the master thermostat 190. In another embodiment, the interface 250 may be displayed on one of the displays 162. As illustrated in FIG. 6, the interface 250 includes season icons or sections 252 that are each associated with a particular season of the year. Each season icon 252 may include a season label 254 indicating the title of the particular season, which may be customized or edited by a user. Each season icon 252 also includes a status label 256, indicating if the settings of the corresponding season icon have been adjusted or customized, and an actions label 258, indicating customization options for the season represented by the particular season icon 252.

The season label 254 may include, by default, one of the traditional seasons, such as "Winter," "Spring," "Summer," and "Fall" to indicate the season to which the particular season icon 252 corresponds. As mentioned, each season may include certain designated time periods, such as months, that may be adjusted. In some embodiments, the time periods across the seasons are consecutive, such that the respective time periods of the seasons do not overlap with one another. As such, each season is then associated with a unique block of time periods. It should be appreciated that additional seasons may be added, and existing seasons may be removed. For example, a user may add a fifth season to the default seasons and/or the user may remove one of the added and/or default seasons. The user may also change the name of each season label 254, such as from "Winter" to "Cold Season" or "Season 1."

In some embodiments, the status label 256 includes a status to indicate if the settings for the particular season icon 252 has been adjusted or customized. As such, the status label 256 may include labels such as "Default" to indicate that the settings have not been adjusted and correspond to default settings, or "Custom" to indicate the settings have been adjusted and do not correspond to default settings. As used herein, default settings refer to settings, such as the rate of airflow and/or the time of each month, that are preselected, such as by a manufacturer, prior to any changes or modifications. By way of example, default settings may be based off data from a database, such as on the memory 166. For example, particular time periods for each group of settings may be determine based on the Gregorian calendar and astronomical positioning of celestial bodies. It should be appreciated that the default settings may also be based at least in part on geographic location of the HVAC system 150, such as based on latitude and longitude of where the HVAC system 150 will be installed. That is, HVAC systems 150 to be installed in a colder region may include different default settings compared to HVAC systems 150 to be installed in a warmer region. Additionally or alternatively, the default settings may be based at least in part on parameters of the zones of a building relative to one another, such as an area, a volume, a location of the zone within the building relative to other zones, an amount or number of windows, another parameter, or any combination thereof. To this end, the status label 256 may also include descriptions to further clarify the settings of the season icon 252.

The actions label 258 may include certain actions a user may perform on the particular season icon 252 to adjust one or more settings of the user interface 250 and/or the HVAC system 150. As illustrated in FIG. 6, an action may include tapping the actions label 258 for one of the season icons 252 to adjust the settings of that season icon 252. Additional actions may also be listed, such as to remove or hide the season icon 252, to move the season icon 252 to a different part of the interface 250, to add an additional season icon 252, to place a note in the season icon 252, to change the appearance of the season icon 252, another suitable action, or any combination thereof. Each action may also be performed via a unique method, such as holding, dragging and dropping, double tapping, another method, or any combination thereof. In some embodiments, the action may also be adjustable by a user.

In some embodiments, the interface 250 also includes a back icon 260 and a done icon 262. If selected, the back icon 260 returns the interface 250 to a previous display of the interface 250. Meanwhile, if selected, the done icon 262 exits the interface 250 to a different display, such as a confirmation display to verify the settings are as desired or a main display of the computing device 188 and/or the master thermostat 190. It should be appreciated that the interface 250 may include several features not already mentioned. For example, each season icon 252 may include additional labels, such as a notes label and additional buttons may also be included on the interface 250, such as a settings icon to adjust display settings of the interface 250, which may include options to change brightness, contrast, units, theme, color, other options, or any combination thereof of the display for the computing device 188 and/or the master thermostat 190.

Furthermore, while the present discussion of the interface 250 has been described as an embodiment having a display with a touch screen or other haptic screen, other embodiments of the interface 250 may be incorporated with panels, displays, or screens, having physical buttons, dials, knobs, switches, and so forth, which may enable any or all of the functionality described herein.

As discussed, setting desired or default rates of airflow for particular seasons may be performed via the computing device 188 and/or the master thermostat 190. FIG. 7 is a schematic of an embodiment of an interface 300 to set such desired or default rates of airflow. In some embodiments, the interface 300 may be accessed via the interface 250, such as from tapping one of the season icons 252. As illustrated in FIG. 7, the interface 300 may include zone settings 302 that may be selected to enable adjustment of the designated rate of airflow for each corresponding zone, as well as to adjust time period settings 304 to adjust the specific time periods that define each season for each zone.

Each of the zone settings 302 includes a zone icon 306, an airflow icon 308, a test icon 310, and a cancel icon 312. The zone icon 306 enables selection of the particular zone for adjustment of airflow and season settings. As shown, each zone icon 306 corresponds with a respective airflow icon 308, test icon 310, and cancel icon 312, which, in the illustrated embodiment, are arranged in a row for each zone. In some embodiments, tapping the zone icon 306 enables selection of the particular zone to enable airflow and season setting adjustment for that zone. Other engagement with the zone icon 306 may enable other functionality. For example, pressing and holding the zone icon 306 may enable user to adjust the name of the zone, such as changing the name from "Zone 1" to "Living Room" or "Room 1."

Tapping or pressing the airflow icon 308 may enable adjustment of the designated rate of airflow to the respective, selected zone. The designated rate of airflow may be set via a sliding bar, a radio button or icon, arrow buttons or icons, a text edit window, a drop down menu, another method, or any combination thereof. In some embodiments, the designated rate of airflow may be set within a range of airflow rate values, which may be based off equipment capacities of the HVAC system 150, for example.

The test icon 310 may enable a user or technician to test the HVAC system 150 using the designated rate of airflow selected with the airflow icon 308. For example, upon actuation of the test icon 310, the HVAC system 150 may calculate or otherwise computationally determine whether providing the designated rate of airflow selected with the airflow icon 308 to the particular zone is feasible in view of other HVAC system 150 characteristics, such as equipment capacities, number of total zones, and so forth. In another example, upon actuation of the test icon 310, the HVAC system 150 may temporarily operate to provide air to the selected zone at the designated rate of airflow determined by the airflow icons 308 and subsequently determine whether the designated rate of airflow is feasible or appropriate. In some embodiments, each zone may be tested individually via respective test icons 310, but in additional or alternative embodiments, each zone is tested simultaneously.

The cancel icon 312 may cancel adjustments made to the corresponding settings of the selected zone and/or cancel testing of the HVAC system 150 initiated via the test icon 310. In certain embodiments, canceling the settings adjustments may result in adjusting the settings to previously selected settings, such as settings prior to current adjustments. In additional or alternative embodiments, canceling the adjustments may result in restoring the settings to the default settings. It should be appreciated that the zone settings 302 may include additional icons to further enhance functionality of the interface 300. By way of example, the zone settings 302 may include icons to turn off airflow to a certain zone, add a note to a particular zone, map a zone to a particular area, another icon to perform a suitable action, or any combination thereof.

The time period settings 304 enable selection of the time periods that are associated with or that define each corresponding season, such as via month icons 314. As an example, the interface 300 illustrated in FIG. 7 may correspond to a "Spring" season, as indicated by the selection of the month icons 314 for March, April, and May. However, a user may select different months to adjust the time period of the season via tapping or otherwise actuating the corresponding month to select and unselect the months via the interface 300. In certain embodiments, instead of tapping each month icon 314, the user may select months via a sliding bar, checkboxes, text edit windows, a drop down menu, other selectable icons, another suitable method, or any combination thereof. Although FIG. 7 illustrates that the seasons are defined by particular months, additional or alternative embodiments may include other time periods or designations, such as days, dates, years, and so forth, to define each season. In some embodiments, the particular time periods for each season may be selected via selection of icons, input of alphanumeric characters, actuation of icons, and so forth. Moreover, additional or alternative embodiments may enable a user to select different time periods for different seasons and different zones. That is, a season for a first zone may be defined by a different time period than that same season for a second zone. Thus, it should be understood that, as discussed herein, each season may be generally described or defined as a block of time in a calendar year or other time period, where the definition of each season may be adjustable to include a block of time based at least in part on a geographic location of the HVAC system 150, a previous calendar year, historical data of weather conditions, historical data of HVAC system 150 operation, a parameter defined by the user, any other parameter, or any combination thereof. Thus, in some embodiments, the block of time corresponding to each season may change each calendar year. Additionally, as seasons may be added and/or removed from the programming of the HVAC system 150, each calendar year may include a different number of seasons. This enables further customization and control by users to adjust airflow settings for the zones in different manners across different calendar years. For example, an airflow rate setpoint for a zone may be adjusted by a first value on a given date in one calendar year, and the airflow rate setpoint may be adjusted by a second, different value on the same given date in a subsequent calendar year. Adjustments in the airflow rate setpoints may be based on historical HVAC system 150 operation, historical weather data, previous HVAC system 150 energy usage, user input, other factors, or any combination thereof.

The interface 300 may include an apply icon 316 to save the adjusted settings and enable operation of the HVAC system 150 at the saved settings. The settings may be saved, such as on the memory 166, such that the HVAC system 150 may operate at the adjusted settings until the settings are readjusted and applied. It should be appreciated that the interface 300 may also include additional icons not already mentioned, such as an icon to change the units of measurement for airflow rate, an icon to return to a previous screen, an icon to cancel all changes, an icon to reset all settings to the default settings, another icon, or any combination thereof.

After the adjusted settings have been applied, such as via the interface 300, the HVAC system 150 is configured to adjust operations based on designated rates of airflow for each zone. FIG. 8 illustrates a flowchart of an embodiment of a method 350 for operating the HVAC system 150 to allocate and distribute airflow across the zones serviced by the HVAC system 150 based on the selected or identified rates of airflow in each zone. As discussed below, the method 350 may include prioritizing airflow at designated rates to certain zones over other zones when a total designated amount of airflow to be supplied by the HVAC system 150 exceeds a threshold, such as a maximum amount of airflow the equipment of the HVAC system 150 is capable of providing. As will be appreciated, the method 350 may be completed by any controller, control panel, or other control system of the HVAC system 150.

At block 352, the HVAC system 150 receives the designated rates of airflow as indicated by the interface 300 and/or the interface 250 for each zone serviced by the HVAC system 150. As mentioned, the designated rates of airflow may be based at least in part on input via the interface 300 on the computing device 188 and/or the master thermostat 190 by a user during or after installation of the HVAC system 150. In some embodiments, the airflow rate for a particular zone may be based on a current yearly season. For example, a designated airflow rate, which may be a target airflow rate and/or an airflow rate setpoint, for a particular zone may be based on the current season, as defined by user input with the interface 300.

At block 354, the HVAC system 150 determines if the total designated rate of airflow exceeds an allowable threshold. That is, the HVAC system 150 determines if the HVAC system 150 equipment is capable of operating to produce the sum total of the designated rates of airflow for the zones serviced by the HVAC system 150. As each zone receives an airflow independent of the other zones, the total designated rate of airflow to be supplied by the HVAC system 150 may be based on a sum of all designated rates of airflow. The total designated rate of airflow is then compared to an allowable threshold indicative of the highest allowable total designated rate of airflow. In some embodiments, the allowable threshold is based on capabilities of components of the HVAC system 150, such as compressor capacity or blower capacity.

If the total designated rate of airflow does not exceed the allowable threshold, the HVAC system 150 operates to deliver the respective designated rate of airflow to each zone, as shown in block 356. That is, the rates of airflow supplied by the HVAC system 150 to the zones serviced by the HVAC system 150 are the same or substantially the same as the designated rates of airflow received by the HVAC system 150 in block 352. In this manner, no further adjustments to the designated rates of airflow may be made, as the HVAC system 150 is capable of delivering the sum total of the designated rate of airflow.

However, if the total designated rate of airflow exceeds the allowable threshold, the HVAC system 150 may adjust the supplied rates of airflow, because operating the HVAC system 150 to deliver an excessive total designated rate of airflow may not be feasible and/or may induce undesired stress on components of the HVAC system 150. As a result, the HVAC system 150 may determine airflow prioritization amongst the zones to adjust and refine the rate of airflow for each zone, such as via an airflow prioritization scheme. In some embodiments, the airflow prioritization scheme may be based at least in part on ratios of designated rates of airflow to the sum total designated rate of airflow. For example, if a received first designated rate of airflow for a first zone is the same as a received second designated rate of airflow for a second zone, and the received total designated rate of airflow exceeds the allowable threshold, the first and second designated rates of airflow may be reduced by a same or similar amount to yield two reduced designated rates of airflow that total to less than the allowable threshold. In this manner, the designated rates of airflow are proportionally decreased.

In additional or alternative embodiments, the airflow prioritization scheme may be based on a difference between a current designated rate of airflow and a previous designated rate of airflow. For example, in an initial setting a first zone may receive a first initially designated rate of airflow and a second zone may receive a second initially designated rate of airflow that is greater than the first initially designated rate of airflow. In another setting subsequent to the initial setting, the first zone may receive a first adjusted designated rate of airflow and the second zone may receive a second adjusted designated rate of airflow that is the same as the first adjusted designated rate of airflow. However, even though the second adjusted designated rate of airflow is the same as the first adjusted designated rate of airflow, because the first initially designated rate of airflow for the first zone was lower than the second initially designated rate of airflow for the second zone, the HVAC system 150 may determine that a season change affects the first zone more than the second zone and thus, the designated rate of airflow for the first zone is not reduced or is reduced less than the second designated rate of airflow for the second zone. As such, when adjusting the designated rates of airflow to reduce the total designated rate of airflow, the adjusted first designated rate of airflow may be greater than the second designated rate of airflow, even though the received designated rates of airflow was initially the same. In this manner, the designated rates of airflow are decreased in proportion to the difference between the received designated rates of airflow and the previously designated rates of airflow.

In further embodiments, the airflow prioritization scheme may also be based at least in part on a difference between a current temperature within a zone and a designated temperature of the zone. For example, a first difference between a current temperature of a first zone and a designated temperature setpoint of the first zone may be greater than a second difference between a current temperature of a second zone and a designated temperature setpoint of the second zone. As such, the rate of airflow into the first zone may be prioritized ahead of the rate of airflow into the second zone to adjust the temperature of the first zone more quickly and compensate for the larger temperature difference. For example, respective decreases in rates of airflow may therefore be proportional to the difference between the current temperature and the designated temperature of the respective zones. It should be appreciated that the airflow prioritization scheme may also be based at least in part on other parameters, such as other historical data regarding designated rates of airflow, an area of each zone, a location of each zone, another suitable parameter, or any combination thereof of any of the aforementioned factors.

After performing airflow prioritization, the HVAC system 150 supplies air to the zones at adjusted designated rates of airflow such that the total designated rate of airflow of the HVAC system 150 is less than the allowable threshold, which may permit the HVAC system 150 to operate without placing undesired stress on components in the HVAC system 150. As such, in block 360, the HVAC system 150 operates to supply air at the adjusted rates of airflow as determined by the airflow prioritization scheme.

It should be appreciated that the adjusted rates of airflow, as determined by the airflow prioritization scheme, may not be applied if airflow to certain zones is suspended or ceased. For example, if the sum total designated rate of airflow to a first zone, a second zone, and a third zone exceeds the allowable threshold, the designated rates of airflow for each zone may be adjusted, such as using the techniques described above, so that the total designated rate of airflow is below the allowable threshold. However, if airflow to the first zone ceases or substantially decreases, for example due to a temperature setpoint of the first zone having been attained, the remaining total designated rate of airflow to the second zone and the third zone may be below the allowable threshold of the HVAC system 150. As such, the HVAC system 150 may operate at the originally-received designated rates of airflow for the second zone and the third zone instead of at the adjusted rates of airflow determined during airflow prioritization. However, if the HVAC system 150 receives calls for conditioning that would request the HVAC system 150 to operate such that the sum total designated rates of airflow exceeds the allowable threshold, such as when airflow is to again be directed to the first zone, the HVAC system 150 may once again operate at the adjusted rates of airflow.

Steps of the method 350 may be performed by the controller 164, such as via the processor 168. Thus, the method 350 may be stored in the memory 166. It should be appreciated that additional steps not already mentioned may be included in the method 350. For example, intermediate steps are performed to determine the appropriate designated rates of airflow during operation. The determination may be based on seasons and seasonal changes, including further calculations associated with the respective properties of different seasons.

As set forth above, embodiments of the present disclosure may provide one or more technical effects useful in the operation of HVAC systems. For example, designated rates of airflow into different zones of an HVAC system may be selected or determined based on a current season or other yearly time period. That is, the HVAC system 150 may be configured to provide a respective designated rate of airflow relative to each zone serviced by the HVAC system 150, where the respective designated rates of airflow are based on the current season. Each season may further be defined by time periods, such as months and days, which may also be adjusted. In some embodiments, the designated rates of airflow are adjustable via a computing device and/or a master thermostat. If the sum total designated rate of airflow is determined to exceed an allowable threshold during operation, the HVAC system may determine an airflow prioritization to adjust the designated rates of airflow for each zone such that the sum total operating rate of airflow is below the allowable threshold. The airflow prioritization scheme may be based at least on parameters of each zone, such as designated rates of airflow, historical data of rates of airflow, and/or a temperature difference between a desired temperature setpoint of the zone and a current temperature of the zone. As such, during each season, the HVAC system may operate to deliver the designated rates of airflow or the adjusted rates of airflow. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, mounting arrangements, use of materials, colors, orientations, and the like, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosed embodiments, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A climate management system, comprising:
    a controller configured to:
        receive an input indicative of an airflow rate setpoint for each zone of a plurality of zones of the climate management system;
        receive a user input comprising a respective airflow rate adjustment value for each airflow rate setpoint, wherein the user input associates each respective airflow rate adjustment value with an annual season of a plurality of annual seasons;
        determine a current annual season of the plurality of annual seasons;
        for each airflow rate setpoint, select the respective airflow rate adjustment value associated with the current annual season; and
        adjust each airflow rate setpoint by applying the respective airflow rate adjustment value associated with the current annual season to the airflow rate setpoint to provide a respective adjusted airflow rate for each zone of the plurality of zones.

2. The climate management system of claim 1, comprising a clock configured to provide data indicative of the current annual season of the plurality of annual seasons.

3. The climate management system of claim 1, wherein the controller is configured to regulate operation of the climate management system to provide air to each zone of the plurality of zones at the respective adjusted airflow rate of the respective zone.

4. The climate management system of claim 3, wherein the controller is configured to adjust operation of louvers, grilles, blowers, variable air volume (VAV) boxes, dampers, diffusers, ducts, registers, or any combination thereof, to provide air to each zone of the plurality of zones at the respective adjusted airflow rate of the respective zone.

5. The climate management system of claim 1, wherein the plurality of annual seasons comprises a spring season, a winter season, a summer season, and a fall season.

6. The climate management system of claim 1, wherein each annual season of the plurality of annual seasons is defined by a respective time range.

7. The climate management system of claim 6, wherein the respective time range defining each annual season of the plurality of annual seasons is user-adjustable.

8. The climate management system of claim 7, wherein the controller comprises a user interface configured to enable adjustment of the respective time range defining each annual season of the plurality of annual seasons.

9. The climate management system of claim 6, wherein the respective time ranges are consecutive and non-overlapping with one another.

10. The climate management system of claim 1, comprising the plurality of zones, wherein each zone of the plurality of zones comprises an interface, wherein the interface is configured to adjust parameters of the zone, wherein the parameters comprise the airflow rate setpoint of the zone, a desired temperature of the zone, a respective time period of each annual season of the plurality of annual seasons, or any combination thereof.

11. The climate management system of claim 10, wherein the interface is configured to enable adjustment of the parameters of the zone via a screen of the interface, wherein the controller is configured to display, via the screen, a sliding bar, a radio button, arrow buttons, a text edit box, a drop down menu, or any combination thereof, to enable adjustment of the parameters of the zone.

12. The climate management system of claim 1, wherein the controller is configured to determine an airflow adjustment prioritization scheme based on the current annual season of the plurality of annual seasons if a sum of the adjusted airflow rates of the plurality of zones exceeds an allowable threshold.

13. The climate management system of claim 12, wherein the controller is configured to regulate operation of the climate management system to provide air to each zone of the plurality of zones based on the airflow adjustment prioritization scheme.

14. A climate management system, comprising:
a control system configured to control climate characteristics in a plurality of zones of a building, wherein the control system comprises a memory device and a processor, and wherein the memory device includes instructions that, when executed by the processor, cause the processor to:
receive a first input indicative of a plurality of airflow rate setpoints, wherein each airflow rate setpoint of the plurality of airflow rate setpoint corresponds with a respective zone of the plurality of zones;
receive a user input comprising a respective airflow rate adjustment value for each airflow rate setpoint of the plurality of airflow rate setpoints, wherein the user input associates each respective airflow rate adjustment value with a yearly season of a plurality of yearly seasons;
calculate a respective adjusted airflow rate for each zone of the plurality of zones based on the first input, the user input, and a current yearly season of the plurality of yearly seasons; and
provide airflow for each zone of the plurality of zones at the respective adjusted airflow rate.

15. The climate management system of claim 14, wherein the user input corresponds first respective airflow rate adjustment values for each airflow rate setpoint of the plurality of airflow rate setpoints based on a first yearly season of the plurality of yearly seasons and second respective airflow rate adjustment values for each airflow rate setpoint of the plurality of airflow rate setpoints based on a second yearly season of the plurality of yearly seasons.

16. The climate management system of claim 14, wherein the instructions, when executed by the processor, cause the processor to associate each yearly season of the plurality of yearly seasons with a respective time period based on a second input.

17. The climate management system of claim 16, wherein the instructions, when executed by the processor, cause the processor to prompt a user for the first input, the user input, the second input, or any combination thereof, via a display of a user interface of the control system.

18. The climate management system of claim 17, comprising a thermostat or a zone panel comprising the user interface and the display.

19. The climate management system of claim 14, wherein the instructions, when executed by the processor, cause the processor to:
calculate a total airflow rate of the climate management system based on adjusted airflow rates;
compare the total airflow rate to an allowable airflow rate threshold; and
determine an airflow prioritization scheme if the total airflow rate is greater than the allowable airflow rate threshold.

20. The climate management system of claim 19, wherein the allowable airflow rate threshold is based on airflow capabilities of components of the climate management system.

21. The climate management system of claim 19, wherein the instructions, when executed by the processor, cause the processor to control operation of the climate management system to provide a first airflow to a first zone of the plurality of zones at the respective adjusted airflow rate for the first zone and to provide a second airflow to a second zone of the plurality of zones at a rate less than the respective adjusted airflow rate for the second zone based on the airflow prioritization scheme.

22. A climate management system, comprising:
a control system configured to control climate characteristics in a plurality of zones of a building, wherein the control system comprises a memory device and a processor, and wherein the memory device includes instructions that, when executed by the processor, cause the processor to:
receive a user input comprising a plurality of airflow rate adjustment values for airflow rate setpoints of the plurality of zones, wherein the user input correlates each airflow rate adjustment value of the plurality of airflow rate adjustment values with an annual season of a plurality of annual seasons;
identify a first annual season of the plurality of annual seasons and a first airflow rate adjustment value of the plurality of airflow rate adjustment values corresponding to the first annual season;
provide airflow to a zone of the plurality of zones at a first rate, wherein the first rate is calculated via application of the first airflow rate adjustment value to a first airflow rate setpoint of the zone;
determine a transition from the first annual season to a second annual season of the plurality of annual seasons;
identify a second airflow rate adjustment value of the plurality of airflow rate adjustment values corresponding to the second annual season; and
provide the airflow to the zone at a second rate in response to determination of the transition from the first annual season to the second annual season and identification of the second airflow rate adjustment value, wherein the second rate is calculated via application of the second airflow rate adjustment value to the first airflow rate setpoint.

23. The climate management system of claim 22, wherein the instructions, when executed by the processor, cause the processor to receive an input indicative of the first airflow rate setpoint via a user interface of the control system.

24. The climate management system of claim 22, wherein the first airflow rate adjustment value, the second airflow rate adjustment value, or both, are based on a location of the zone within the building.

25. The climate management system of claim 22, wherein the instructions, when executed by the processor, cause the processor to prompt, via a user interface, additional user input to define a first time period associated with the first annual season and a second time period associated with the second annual season.

26. The climate management system of claim 22, wherein the first annual season and the second annual season do not overlap with one another.

27. The climate management system of claim 22, wherein the zone is a first zone, and wherein the instructions, when executed by the processor, cause the processor to:
provide airflow to a second zone of the plurality of zones at a third rate, wherein the third rate is calculated via application of a third airflow rate adjustment value to an additional airflow rate setpoint of the second zone, the third airflow rate adjustment value corresponding to the first annual season of the plurality of annual seasons; and
provide the airflow to the second zone at a fourth rate in response to determination of the transition from the first annual season to the second annual season, wherein the fourth rate is calculated via application of a fourth airflow rate adjustment value to the additional airflow rate setpoint of the second zone, the fourth airflow rate adjustment value corresponding to the second annual season of the plurality of annual seasons.

28. The climate management system of claim 22, wherein the instructions, when executed by the processor, cause the processor to:
receive the user input via a user interface of a thermostat;
select the first airflow rate adjustment value of the plurality of airflow rate adjustment values corresponding to the first annual season as indicated by the user input; and
select the second airflow rate adjustment value of the plurality of airflow rate adjustment values corresponding to the second annual season as indicated by the user input.

* * * * *